(12) United States Patent
Huang et al.

(10) Patent No.: US 11,656,416 B2
(45) Date of Patent: May 23, 2023

(54) OPTICAL WAVEGUIDE CONNECTION ASSEMBLY AND OPTICAL MODULE COMPRISING OPTICAL WAVEGUIDE CONNECTION ASSEMBLY

(71) Applicant: Molex, LLC, Lisle, IL (US)

(72) Inventors: Sung-Ping Huang, Hsinchu (TW); Zuon-Min Chuang, Taoyuan (TW)

(73) Assignee: Molex, LLC, Lisle, IL (US)

( * ) Notice: Subject to any disclaimer, the term of this patent is extended or adjusted under 35 U.S.C. 154(b) by 0 days.

(21) Appl. No.: 17/379,142

(22) Filed: Jul. 19, 2021

(65) Prior Publication Data
US 2022/0026650 A1   Jan. 27, 2022

(30) Foreign Application Priority Data
Jul. 24, 2020   (CN) .......................... 202010721517.5

(51) Int. Cl.
*G02B 6/42* (2006.01)

(52) U.S. Cl.
CPC ......... *G02B 6/4245* (2013.01); *G02B 6/4206* (2013.01); *G02B 6/4212* (2013.01); *G02B 6/4239* (2013.01); *G02B 6/4266* (2013.01)

(58) Field of Classification Search
CPC .. G02B 6/4212; G02B 6/4245; G02B 6/4206; G02B 6/4239; G02B 6/4266; G02B 6/3636; G02B 6/4243; G02B 6/4292; G02B 6/30; G02B 6/4267; G02B 6/4219; G02B 6/424; G02B 6/428
See application file for complete search history.

(56) References Cited

U.S. PATENT DOCUMENTS

| 11,300,728 | B2 * | 4/2022 | Traverso .............. G02B 6/4212 |
| 2006/0239605 | A1 | 10/2006 | Palen et al. |

FOREIGN PATENT DOCUMENTS

| CN | 1326248 A | 12/2001 |
| CN | 107407778 A | 11/2017 |
| CN | 208125949 U | 11/2018 |
| CN | 210323477 U | 4/2020 |
| WO | 2009119966 A1 | 10/2009 |

* cited by examiner

*Primary Examiner* — John Bedtelyon (57) ABSTRACT

The present disclosure provides an optical waveguide connection assembly and an optical module including the optical waveguide connection assembly. The optical waveguide connection assembly includes a holder, an optical fiber, a connection member and an optical coefficient adjusting member. The holder has a first part and a second part. The first part is positioned a side of the optical element, the second part is positioned above the optical element. The optical fiber is fixed to the first par. The connection member is provided between the second part and the optical element. The optical coefficient adjusting member is provided between the optical fiber and the optical element, so that a beam is capable of being transferred between the optical fiber and the optical element via the optical coefficient adjusting member. The optical waveguide connection assembly is fixed to the optical element via the connection member and the optical coefficient adjusting member.

20 Claims, 9 Drawing Sheets

OPTICAL WAVEGUIDE CONNECTION ASSEMBLY AND OPTICAL MODULE COMPRISING OPTICAL WAVEGUIDE CONNECTION ASSEMBLY

RELATED APPLICATIONS

The present application claims priority to Chinese Patent Application No. 202010721517.5 filed Jul. 24, 2020 which is incorporated by reference in its entirety.

TECHNICAL FIELD

The present disclosure relates to an optical waveguide connection assembly and an optical module comprising the optical waveguide connection assembly. Furthermore, the present disclosure relates to an overhang-type optical waveguide connection assembly and an optical module having the overhang-type optical waveguide connection assembly.

BACKGROUND

Figure 1:
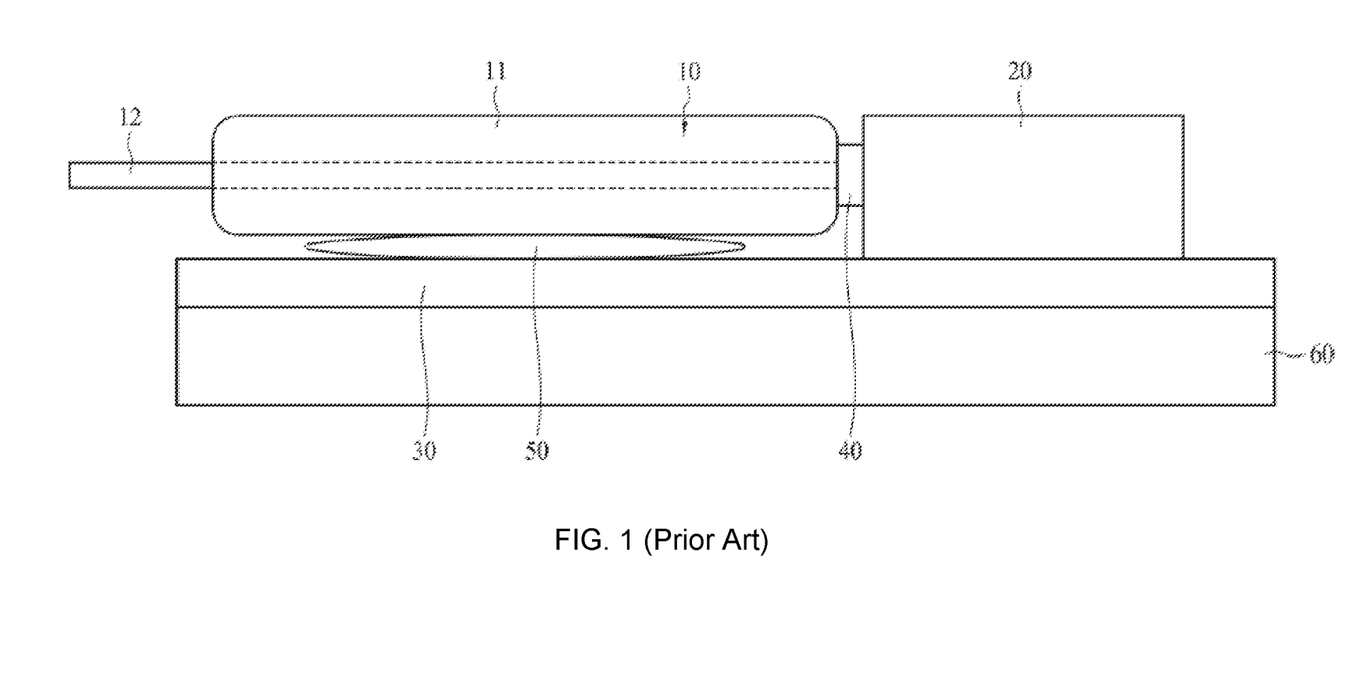
FIG. 1 is a side view of an existing optical module.

FIG. 1 is a side view of an existing optical module 1. As shown in FIG. 1, an optical module 1 has an optical waveguide connection assembly 10 and an optical element 20. The optical waveguide connection assembly 10 has a holder 11 and an optical fiber 12, the holder 11 is used to fix the optical fiber 12. The optical waveguide connection assembly 10 is connected with the optical element 20 and is provided on the circuit board 60, an optical coefficient adjusting member 40 is provided between the optical fiber 12 and the optical element 20, a beam may be transferred among the optical fiber 12 of the optical waveguide connection assembly 10, the optical coefficient adjusting member 40 and the optical element 20.

In the existing optical module 1, in order to fix a relative position of the optical waveguide connection assembly 10 and the optical element 20 to align the optical fiber 12 of the optical waveguide connection assembly 10 with an optical waveguide structure (not shown) of the optical element 20, it is necessary to provide a carrier 30 to carry the optical waveguide connection assembly 10 and the optical element 20.

However, because the carrier 30 carrying the optical waveguide connection assembly 10 and the optical element 20 and the circuit board 60 are different elements, mating between the optical waveguide connection assembly 10 and the optical element 20 is easily affected by warpage of the carrier 30 or the circuit board 60, or affected by a connecting state of the optical waveguide connection assembly 10 and the carrier 30.

In other words, difference between the carrier 30 and the circuit board 60 in coefficient of thermal expansion (CTE) may cause the carrier 30 and the circuit board 60 to generate warpages at different extents due to thermal effect in manufacturing methods, in turn cause the mating between the optical fiber 12 of the optical waveguide connection assembly 10 and the optical waveguide structure of the optical element 20 to generate deviation. Or, the optical waveguide connection assembly 10 and the carrier 30 are connected by for example a resin 50, and an amount, a position or distribution and the like of the resin 50 may generate deviations in the manufacturing method, the deviations affect the connecting state between the optical waveguide connection assembly 10 and the carrier 30, in turn cause the mating between the optical fiber 12 of the optical waveguide connection assembly 10 and the optical waveguide structure of the optical element 20 to generate deviation.

The above description of the "background" merely provides a background, and it is not admitted that the above description of "background" discloses the object of the present disclosure, and the above description of "background" does not constitute the background of the present disclosure, any above description of the "background" should not be considered as any part of the present disclosure.

SUMMARY

An embodiment of the present disclosure provides an optical waveguide connection assembly which is connected with an optical element. The optical waveguide connection assembly comprises a holder, an optical fiber, a connection member and an optical coefficient adjusting member. The holder has a first part and a second part. The first part is positioned a side of the optical element, the second part is positioned above the optical element. The optical fiber is fixed to the first par. The connection member is provided between the second part and the optical element. The optical coefficient adjusting member is provided between the optical fiber and the optical element, so that a beam is capable of being transferred between the optical fiber and the optical element via the optical coefficient adjusting member. The optical waveguide connection assembly is fixed to the optical element via the connection member and the optical coefficient adjusting member.

In some embodiments, the connection member and the optical coefficient adjusting member are provided to be spaced apart from each other.

In some embodiments, the holder further has a first groove which is provided to the second part and is used to prevent the connection member from contacting the optical coefficient adjusting member.

In some embodiments, the holder further has a second groove which is provided to the second part and is provided to be spaced apart from the first groove, the first groove is close to the connection member, the second groove is close to the optical coefficient adjusting member.

In some embodiments, the optical element is a non flip-chipped type photonic integrated circuit or a flip-chipped type photonic integrated circuit.

In some embodiments, the first part of the holder has a first side and a second side opposite to the first side, the second side faces the optical element.

In some embodiments, the optical fiber has a protruding portion which protrudes from the second side.

In some embodiments, the optical coefficient adjusting member is provided between the protruding portion and the optical element.

In some embodiments, a coefficient of thermal expansion of the holder is essentially the same as or similar to a coefficient of thermal expansion of the optical element.

In some embodiments, a coefficient of thermal expansion of the holder is a range between 0.5 ppm/° C. and 10 ppm/° C., a coefficient of thermal expansion of the optical element is a range between 0.5 ppm/° C. and 10 ppm/° C.

In some embodiments, the connection member is an epoxy, and the optical coefficient adjusting member is an index matching fluid.

An embodiment of the present disclosure provides an optical module comprising a substrate, an optical element and the optical waveguide connection assembly of the above embodiments. The optical element is positioned on the substrate. The optical waveguide connection assembly is positioned above the substrate and is connected with the optical element.

In the present disclosure, the holder of the optical waveguide connection assembly has the first part which is positioned at a side of the optical element and the second part which is positioned above the optical element. So, because the optical waveguide connection assembly is directly connected to the optical element, a carrier may be not additionally provided to carry the optical waveguide connection assembly, in turn cost from material may be reduced and the manufacturing method of the optical module may be simplified.

Moreover, by that the optical waveguide connection assembly is connected with the optical element, the present disclosure also may avoid a problem of mating deviation of between the optical waveguide connection assembly and the optical element which is resulted from warpages at different extents generated due to thermal effect in manufacturing methods of the carrier and the substrate in the existing structure. Specifically, by reducing a necessary element, the present disclosure may avoid a structural mating deviation generated by a superfluous element which changes with temperature.

The technical features and advantages of the present disclosure are widely and generally described as above, so the detailed description of the present disclosure can be better understood. Other technical features and advantages constituting the subject matters of the claims of the present disclosure will be described below. It is to be understood by those of ordinary skill in the art that, the concept and specific embodiments disclosed below may be quite easily used to make modification or design other configuration or process to realize the same objects of the present disclosure. It is to be understood by those of ordinary skill in the art that these equivalent configurations cannot depart from the spirit and scope of the present disclosure as defined by the appended claims.

BRIEF DESCRIPTION OF THE DRAWINGS

Referring to the detailed description and the claims in combination with the drawings, the disclosed contents of the present disclosure can be fully understood, the same reference numeral indicates the same element in the drawings.

DETAILED DESCRIPTION OF THE PREFERRED EMBODIMENTS

Embodiments or examples of the content of the present disclosure shown in the drawings are described in a specific language. It is to be understood that this is not intended to limit the scope of the present disclosure. Any variations or modifications of the described embodiments, as well as any further applications of the principles described herein, will normally occur to those skilled in the art. The reference numerals may be repeated in each embodiment, but even if the elements have the same reference numeral, the features in the embodiment are not necessarily used in another embodiment.

It will be understood that the various elements, assemblies, regions, layers or sections may be described herein using the terms first, second, third, etc., however, these elements, assemblies, regions, layers or sections are not limited to these terms. These terms are only used to distinguish one element, assembly, region, layer or section from another element, assembly, region, layer or section. The first element, assembly, region, layer or section described below may be referred to as a second element, assembly, region, layer or section without departing from the teachings of the inventive concept of the present disclosure.

The words used in the present disclosure are only used for the purpose of describing the specific exemplary embodiments and are not intended to limit the concept of the present disclosure. As used herein, "a" and "the" in singular are also used to contain plural, unless otherwise expressly indicated herein. It is to be understood that the word "include" used in the specification specifically indicates the existence of a feature, integer, step, operation, element or assembly which is described, but does not excludes the existence of one or more other features, integers, steps, operations, elements, assemblies or groups thereof.

Figure 2:
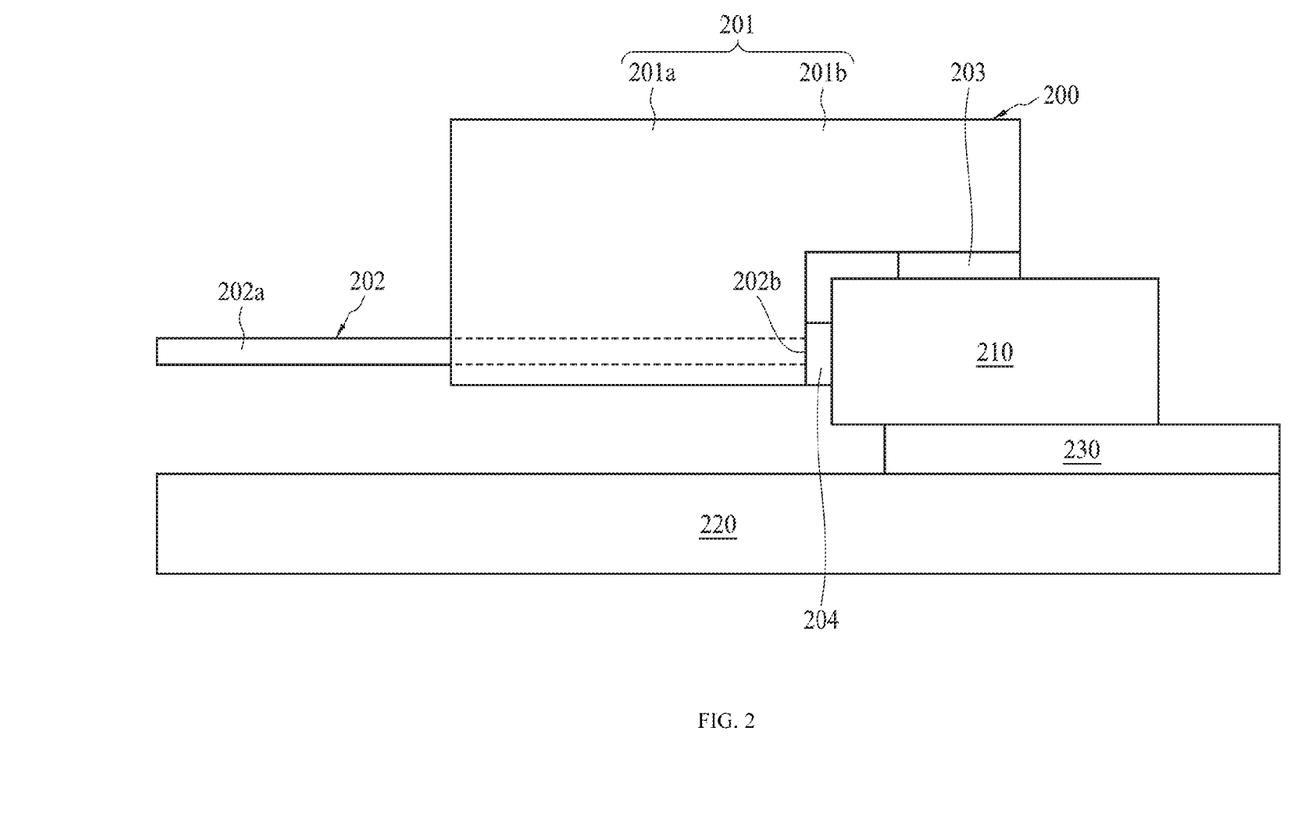
FIG. 2 is a side view of an optical module of the present disclosure.

FIG. 2 is a side view of an optical module 2 of the present disclosure. In some embodiments, for example, the optical module 2 has an optical waveguide connection assembly 200 and an optical element 210. The optical waveguide connection assembly 200 is connected with the optical element 210, the optical element 210 for example is a photonic integrated circuit (PIC), has an optical waveguide structure (not shown), such a structure of the optical element 210 is not intended as limitation. A beam generated by a light source may be emitted out from a periphery of the optical element 210 (for example but not limited to, a side connected with an optical fiber 202 of the optical waveguide connection assembly 200) via the optical waveguide structure, or a beam inputted from the external is received and is incident to the optical element 210 via the optical fiber 202. It is noted that, the optical element 210 for example may be a flip-chipped packaging or a non flip-chipped packaging structure. Here, the optical element 210 will be described by taking the flip-chipped packaging structure as an example, however, it is not used to limit the present disclosure. The optical waveguide structure (not shown) of the optical element 210 may positioned in a position which is close to a lower side of the optical element 210.

In some embodiments, the optical module 2 may further have a substrate 230 and a circuit board 220, for example, the optical element 210 is provided on the substrate 230 and then is electrically connected with the circuit board 220. The substrate 230 and the circuit board 220 may be the same or may be not the same in material. The substrate 230 may be a carrier without a circuit, or an interposer having a circuit structure, or a circuit board.

In some embodiments, the optical waveguide connection assembly 200 has a holder 201, the optical fiber 202, a connection member 203 and an optical coefficient adjusting member 204.

The holder 201 has a first part 201a and a second part 201b. The first part 201a is positioned at a side of the optical element 210 (for example, a side where the optical waveguide structure of the optical element 210 is connected), the second part 201b is positioned above the optical element 210. In some embodiments, the first part 201a may further have a cover (for example which is positioned at a lower side of the first part 201a) and an insertion groove structure (not shown), the cover and the insertion groove structure are engaged with each other to form the first part 201a, by opening or closing the cover, the optical fiber 202 may be loaded to or unloaded from the insertion groove structure. It is noted that, a shape of the holder 201 is not limited thereto but can be determined based a principle that the first part 201a of the holder 201 may make the optical fiber 202 and the optical waveguide structure of the optical element 210 (not shown) mated with each other. Certainly, considering a requirement on stability of structure of the holder 201, a volume ratio between the first part 201a and the second part 201b of the holder 201 may have different design manners. In addition, in some embodiments, the holder 201 may employ a material which has a coefficient of thermal expansion essentially the same as or similar to a coefficient of thermal expansion of the optical element 210, so that structural deviation generated from thermal effect in manufacturing method or product use may be further reduced. In some embodiments, the coefficient of thermal expansion of the holder 201 may be a range between 0.5 ppm/° C. and 10 ppm/° C. In some embodiments, the coefficient of thermal expansion of the optical element 210 may be a range between 0.5 ppm/° C. and 10 ppm/° C. In some embodiments, the coefficient of thermal expansion of the holder 201 may be a range which is larger than 0.5 ppm/° C. and less than 10 ppm/° C. In some embodiments, the coefficient of thermal expansion of the optical element 210 may be a range which is larger than 0.5 ppm/° C. and less than 10 ppm/° C. In other words, the holder 201 and the optical element 210 may employ materials which have the same coefficients of thermal expansion (for example, all the coefficients of thermal expansion are 3 ppm/° C.), or the holder 201 and the optical element 210 may employ materials which have similar coefficients of thermal expansion (for example, the holder 201 employs a material which has the coefficient of thermal expansion of 3.25 ppm/° C., and the optical element 210 employs a material which has the coefficient of thermal expansion of 2.6 ppm/° C.). In some embodiments, the whole or a part of the material of the holder 201 for example may be glasses, plastics or other appropriate material. In some embodiments, the first part 201a and the second part 201b may be integrally formed by the same material. In other embodiments, a material of a major configuration of the holder 201 for example may be plastics, and a material of the cover of the first part 201a may be glasses.

The optical fiber 202 is fixed to the first part 201a of the holder 201, an end 202a is exposed from the first part 201a, and the other end 202b is connected with the optical element 210 via the optical coefficient adjusting member 204. Here, one optical fiber 202 is taken as an example for description, but this is not intended as limitation, in some embodiments, the optical waveguide connection assembly 200 may have a plurality of optical fibers 202, which in turn form an optical fiber array.

The connection member 203 is provided between the second part 201b of the holder 201 and the optical element 210, the connection member 203 is used to fix and overhang the optical waveguide connection assembly 200 to the optical element 210. In some embodiments, the optical waveguide connection assembly 200 or the second part 201b of the optical waveguide connection assembly 200 is adhered on the optical element 210 directly by the connection member 203. A material of the connection member 203 for example may be epoxy, a solder or other appreciate connecting or adhering material. It is noted that, by that the optical waveguide connection assembly 200 is connected with the optical element 210 via the connection member 203, the optical waveguide connection assembly 200 is positioned at a periphery of the optical element 210, for example, the first part 201a is positioned a side of the optical element 210, the second part 201b is positioned above the optical element 210. In the other aspect, the optical waveguide connection assembly 200 does not contact the substrate 230 and the circuit board 220.

The optical coefficient adjusting member 204 is provided between the optical fiber 202 and the optical element 210, the optical coefficient adjusting member 204 is used to fix the optical waveguide connection assembly 200 to the optical element 210. In some embodiments, the optical waveguide connection assembly 200 or the first part 201a of the optical waveguide connection assembly 200 is adhered on a side of the optical element 210 directly by the optical coefficient adjusting member 204. The optical coefficient adjusting member 204 for example is an index matching fluid. A beam is transferred between the optical fiber 202 and the optical element 210 via the optical coefficient adjusting member 204. In other words, a beam emitted out from the optical element 210 will first pass through the optical coefficient adjusting member 204 and then be incident to the optical fiber 202, or a beam incident to the optical fiber 202 will first pass through the optical coefficient adjusting member 204 and then be incident to the optical element 210. A refractive index of the optical fiber 202 and a refractive index of the optical waveguide structure of the optical element 210 may be matched by means of the optical coefficient adjusting member 204, so that leakage of the beam may be reduced, efficacy of signal transferring may be increased. Furthermore, an optical coefficient (for example, refractive index) of the optical coefficient adjusting member 204 is dependent on an optical coefficient of the optical fiber 202 and an optical coefficient of the optical waveguide structure (not shown) of the optical element 210.

In conclusion, in comparison with the existing optical module 1 as shown in FIG. 1, in the optical module 2 of the present disclosure, the holder 201 of the optical waveguide connection assembly 200 has the first part 201a which is positioned at a side of the optical element 210 and the second part 201b which is positioned above the optical element 210. So, because the optical waveguide connection assembly 200 is directly connected to the optical element 210 (for example overhung to the optical element 210), the optical module 2 of the present disclosure may not employ a carrier additionally provided to carry the optical waveguide connection assembly 200, in turn cost from material may be reduced and the manufacturing method of the optical module 2 may be simplified.

Moreover, by that the optical waveguide connection assembly 200 is connected with the optical element 210, the optical module 2 of the present disclosure also may avoid a problem of mating deviation of between the optical waveguide connection assembly 200 and the optical element 210 which is resulted from warpages at different extents generated due to thermal effect in manufacturing methods of the carrier and the substrate (as shown in FIG. 1) in the existing structure. Specifically, by reducing a necessary element (for example, the carrier), the optical module 2 of the present disclosure may avoid a structural mating deviation generated by a superfluous element which changes with temperature.

Figure 3:
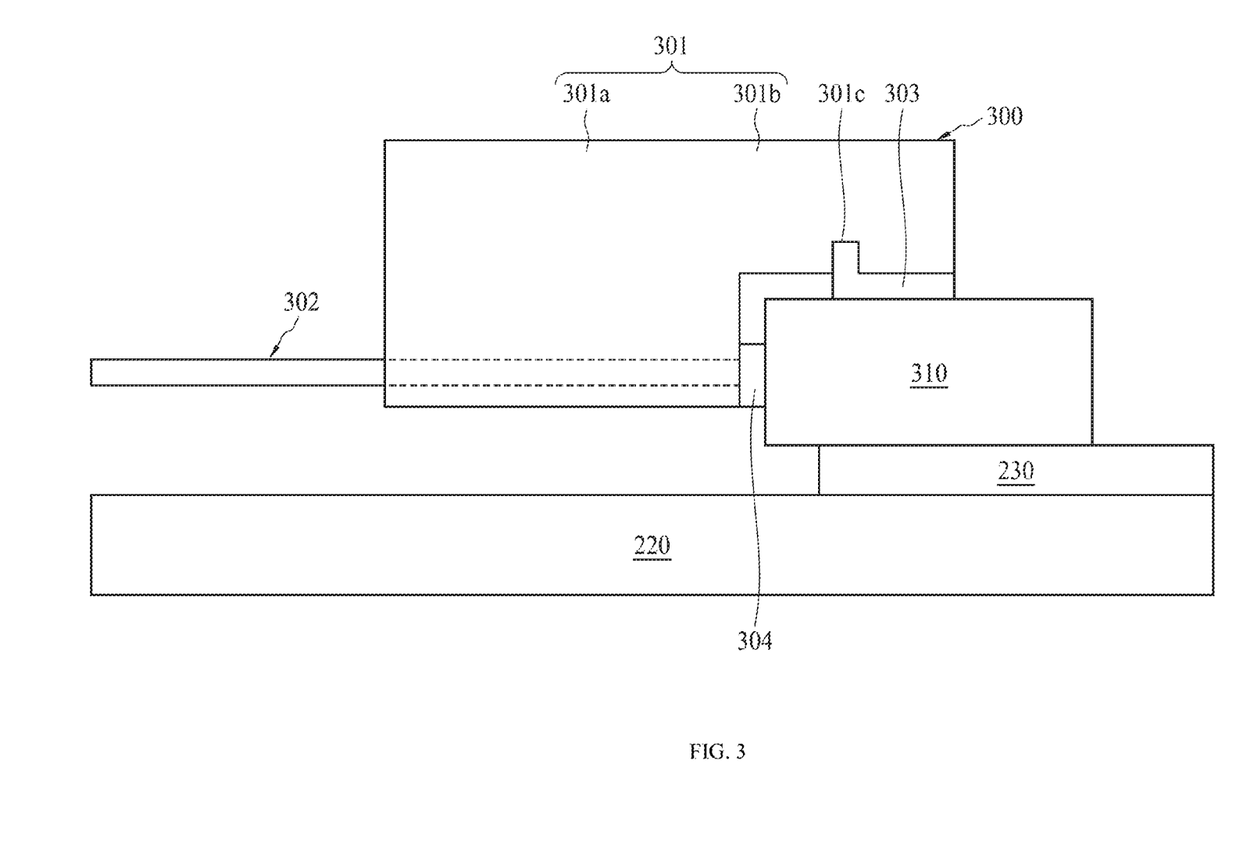
FIG. 3 is a side view of another optical module of the present disclosure.

FIG. 3 is a side view of another optical module 3 of the present disclosure. For example, the optical module 3 has an optical waveguide connection assembly 300 and an optical element 310. The optical waveguide connection assembly 300 has a holder 301, an optical fiber 302, a connection member 303 and an optical coefficient adjusting member 304. The optical element 310, the optical fiber 302, the connection member 303 and the optical coefficient adjusting member 304 are respectively similar to the optical element 210, the optical fiber 202, the connection member 203 and the optical coefficient adjusting member 204 of the optical module 2 of FIG. 2 in structure, so the description thereof is not repeated.

The optical module 3 differs from the optical module 2 of FIG. 2 in that: the holder 301 further has a first groove 301c provided to a second part 301b, the first groove 301c is used to prevent the connection member 303 from contacting the optical coefficient adjusting member 304. A shape of the first groove 301c is not intended as limitation, a cross sectional shape of the first groove 301c may be square, triangle, circle or other shape.

Therefore, in addition to that the optical module 3 has functions as the optical module 2, the optical module 3 may further make the connection member 303 only provided within a preset region by means of the first groove 301c of the holder 301. In other words, the first groove 301c may act as a limiting structure of the connection member 303, when the connection member 303 is a fluid epoxy or a solder, by means of the first groove 301c of the holder 301, the connection member 303 will not overflow the first groove 301c to contact the optical coefficient adjusting member 304 and contaminate the optical coefficient adjusting member 304.

Figure 4:
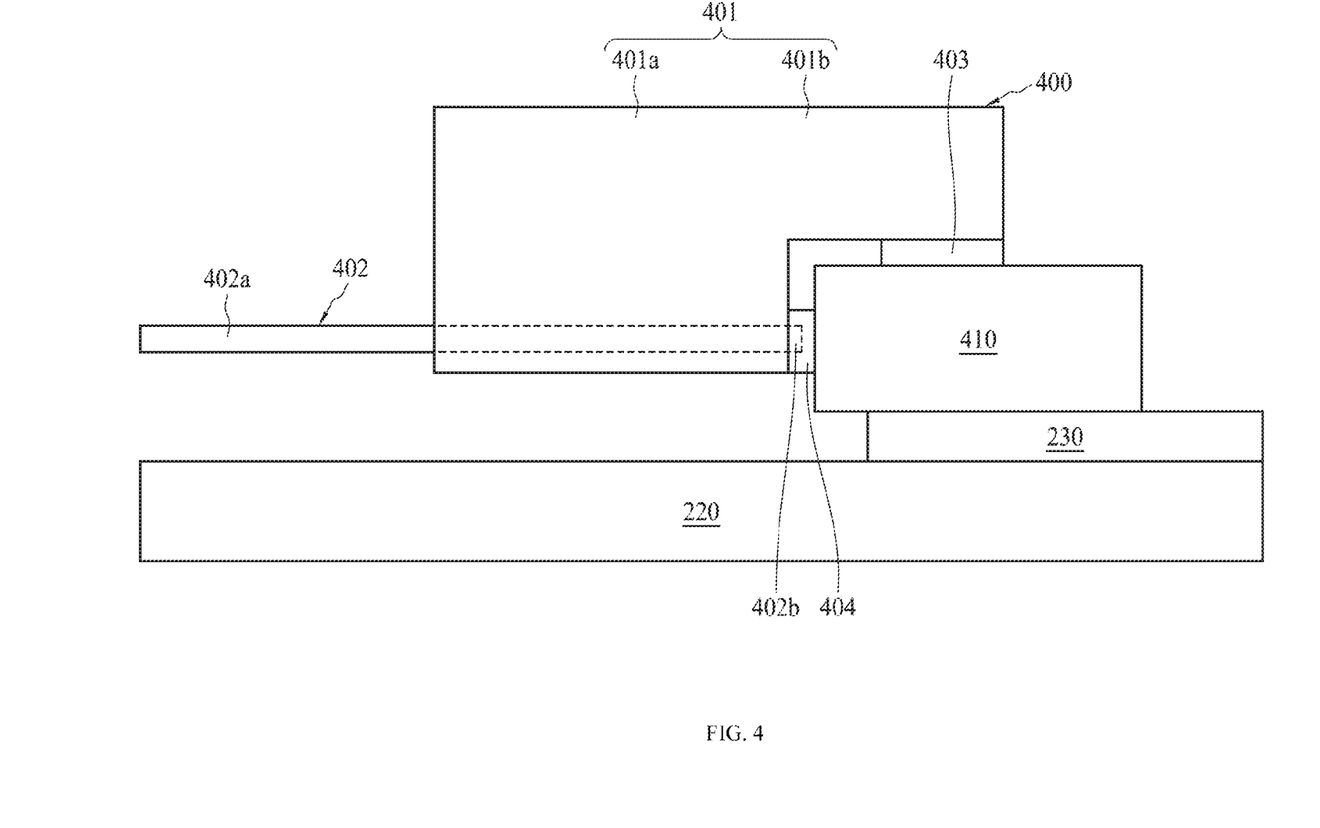
FIG. 4 is a side view of another optical module of the present disclosure.

FIG. 4 is a side view of another optical module 4 of the present disclosure. For example, the optical module 4 has an optical waveguide connection assembly 400 and an optical element 410. The optical waveguide connection assembly 400 has a holder 401, an optical fiber 402, a connection member 403 and an optical coefficient adjusting member 404. The optical element 410, the connection member 403 and the optical coefficient adjusting member 404 are respectively similar to the optical element 210, the connection member 203 and the optical coefficient adjusting member 204 of the optical module 2 of FIG. 2 in structure, so the description thereof is not repeated.

The optical module 4 differs from the optical module 2 of FIG. 2 in that: two ends 402a, 402b of the optical fiber 402 are exposed from a first part 401a. In other words, an end 402b (or referred to as a protruding portion) of the optical fiber 402 which is connected with the optical coefficient adjusting member 404 is exposed from the first part 401a of the holder 401, and may be surrounded by the optical coefficient adjusting member 404. That is, the first part 401a of the holder 401 has a first side and a second side opposite to the first side, the second side faces the optical element 410, and the protruding portion of the optical fiber 402 has (that is, the end 402b) protrudes from the second side, the optical coefficient adjusting member 404 is provided between the protruding portion and the optical element 410.

Therefore, in addition to that the optical module 4 has functions as the optical module 2, by that the optical fiber 402 is exposed to a side of the first part 401a of the holder 401, difficulty of a mating process between the optical waveguide connection assembly 400 and the optical element 410 may be lowered, and accuracy of the mating between the optical waveguide connection assembly 400 and the optical element 410 may be increased. That is, because the optical fiber 402 has the protruding portion (that is, the end 402b) exposed to a side of the first part 401a, a position of the optical fiber 402 is visible, and difficulty of a mating process between the optical fiber 402 and the optical waveguide structure (not shown) of the optical element 410 may be lowered, at the same time accuracy of the mating may be increased.

Figure 5:
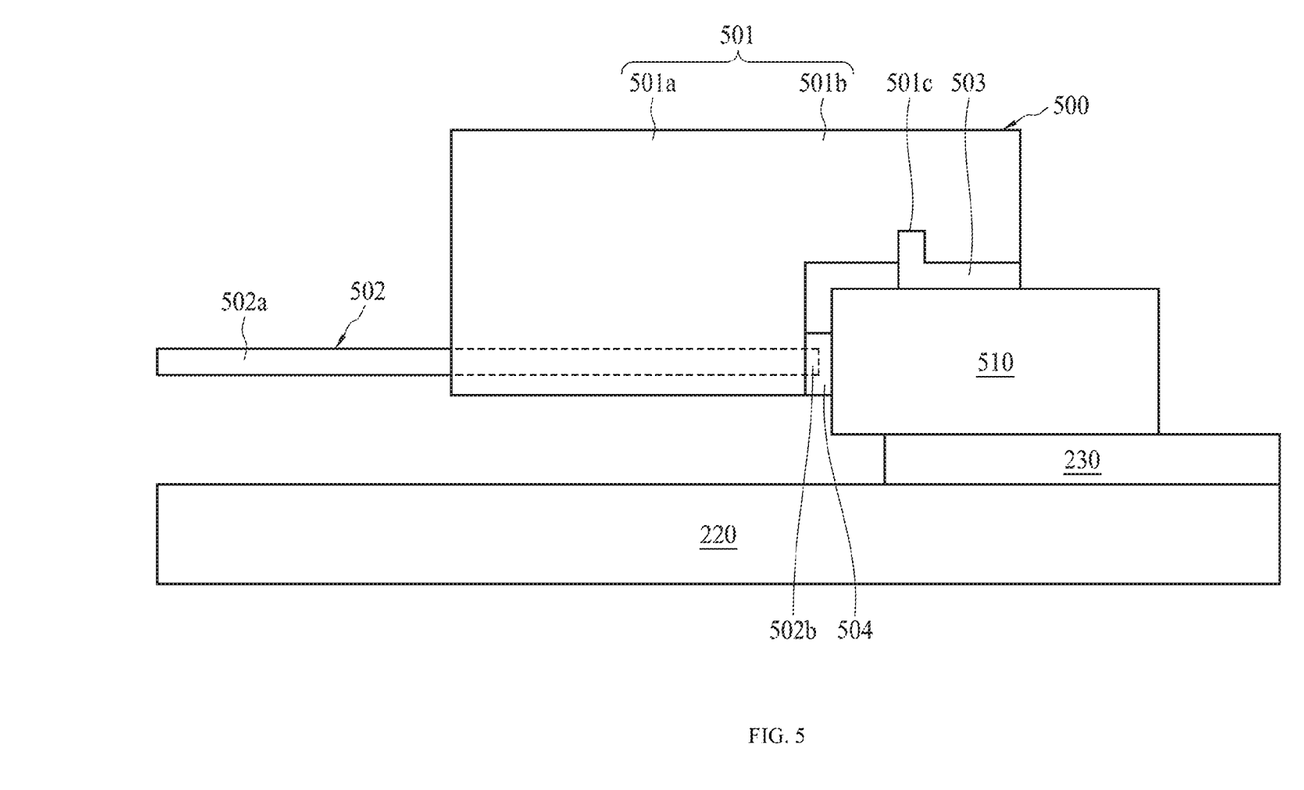
FIG. 5 is a side view of another optical module of the present disclosure.

FIG. 5 is a side view of another optical module 5 of the present disclosure. For example, the optical module 5 has an optical waveguide connection assembly 500 and an optical element 510. The optical waveguide connection assembly 500 has a holder 501, an optical fiber 502, a connection member 503 and an optical coefficient adjusting member 504. The optical element 510, the connection member 503 and the optical coefficient adjusting member 504 are respectively similar to the optical element 210, the connection member 203 and the optical coefficient adjusting member 204 of the optical module 2 of FIG. 2 in structure, so the description thereof is not repeated.

The optical module 5 differs from the optical module 2 of FIG. 2 in that: the holder 501 further has a first groove 501c provided to a second part 501b, two ends 502a, 502b of the optical fiber 502 are exposed from a first part 501a. In other words, an end 502b of the optical fiber 502 which is connected with the optical coefficient adjusting member 504 is exposed to the first part 501a of the optical waveguide connection assembly 500, and may be surrounded by the optical coefficient adjusting member 504. In addition, a shape of the first groove 501c is not intended as limitation, a cross sectional shape the first groove 501c may be square, triangle, circle or other shape.

Therefore, in addition to that the optical module 5 has functions as the optical module 2, the optical module 5 may have function as the optical modules 3, 4, that is, by that the first groove 501c acts as a limiting structure with respect to the connection member 503, when the connection member 503 is a fluid epoxy or a solder, by means of the first groove 501c, the connection member 503 will not overflow the first groove 501c to contact the optical coefficient adjusting member 504 and contaminate the optical coefficient adjusting member 504. Also, by that the optical fiber 502 has a protruding portion (that is, the end 502b) exposed to a side of the first part 501a, a position of the optical fiber 502 is visible, difficulty of a mating process between the optical fiber 502 and an optical waveguide structure (not shown) of the optical element 510 may be lowered, at the same time accuracy of the mating may be increased.

Figure 6:
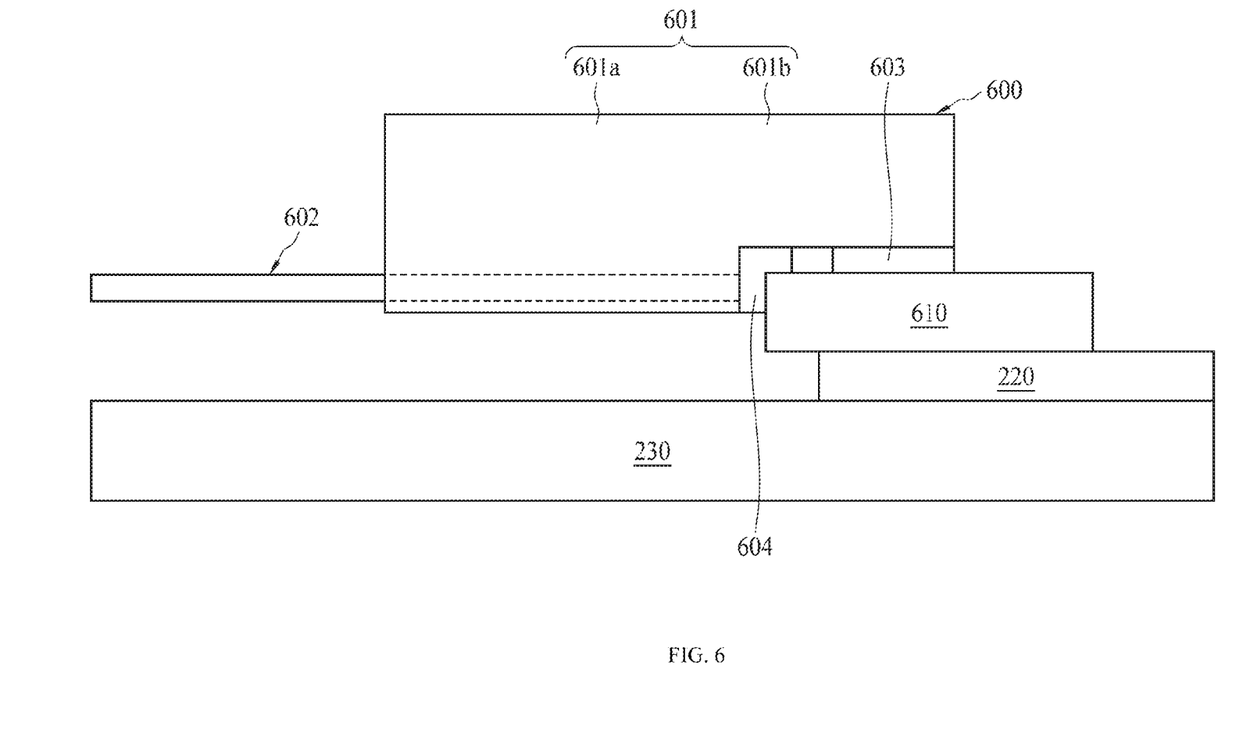
FIG. 6 is a side view of another optical module of the present disclosure.

FIG. 6 is a side view of another optical module 6 of the present disclosure. For example, the optical module 6 has an optical waveguide connection assembly 600 and an optical element 610. The optical waveguide connection assembly 600 has a holder 601, an optical fiber 602, a connection member 603 and an optical coefficient adjusting member 604. The optical fiber 602 and the connection member 603 are respectively similar to the optical fiber 202 and the connection member 203 of the optical module 2 of FIG. 2 in structure, so the description thereof is not repeated.

The optical module 6 differs from the optical module 2 of FIG. 2 in that: for example, the optical element 610 is a non flip-chipped packaging structure. Therefore, an optical waveguide structure (not shown) of the optical element 610 may be positioned at a position which is close to an upper side of the optical element 610, a first part 601a of the optical waveguide connection assembly 600 which is positioned at a side of the optical element 610 may be reduced in volume. Also, the connection member 603 and the optical coefficient adjusting member 604 are provided to be spaced apart from each other, a part of the optical coefficient adjusting member 604 may extend to an upper surface of the optical element 610, that is, the same surface where the connection member 603 is positioned.

Therefore, the optical module 6 of the present disclosure not only may be applied to the flip-chipped packaging structure, but also may be applied to a non flip-chipped packaging structure, and similarly may have functions as the optical module 2.

Figure 7:
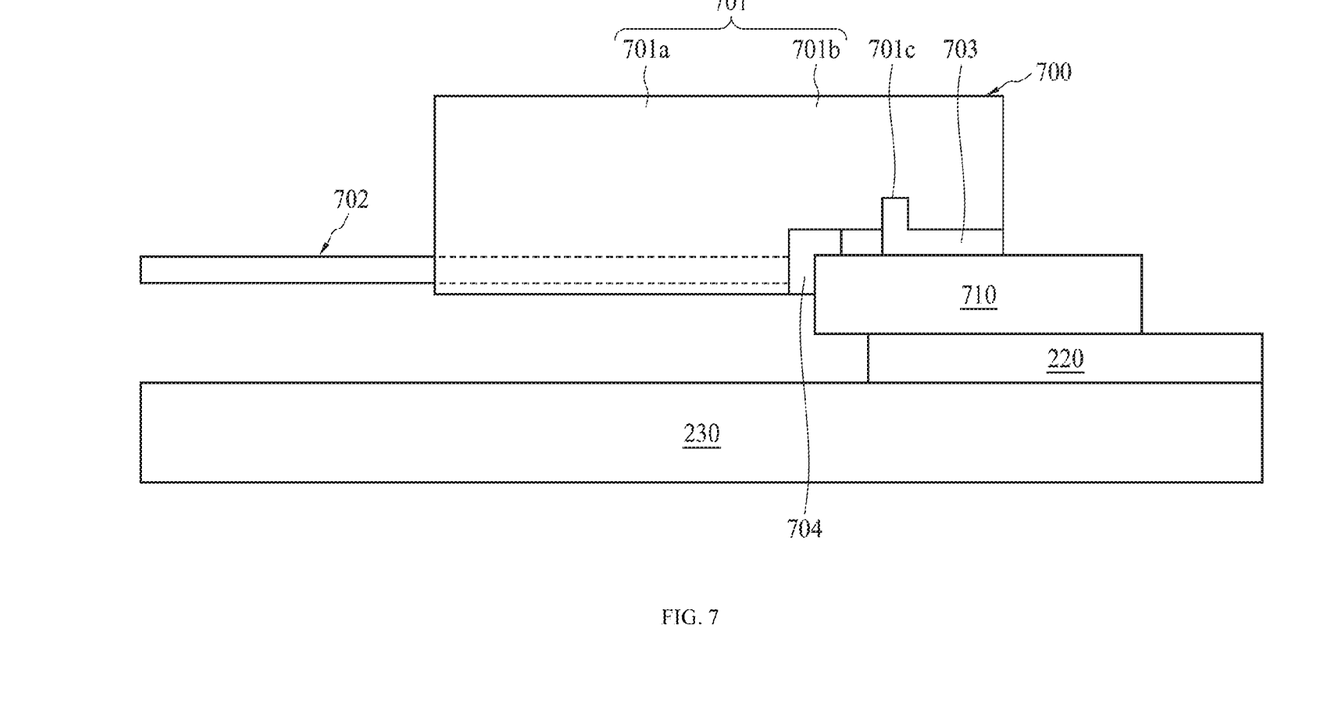
FIG. 7 is a side view of another optical module of the present disclosure.

FIG. 7 is a side view of another optical module 7 of the present disclosure. For example, the optical module 7 has an optical waveguide connection assembly 700 and an optical element 710. The optical waveguide connection assembly 700 has a holder 701, an optical fiber 702, a connection member 703 and an optical coefficient adjusting member 704. The optical element 710, the optical fiber 702, the connection member 703 and the optical coefficient adjusting member 704 are respectively similar to the optical element 610, the optical fiber 602, the connection member 603 and the optical coefficient adjusting member 604 of the optical module 6 of FIG. 6 in structure, so the description thereof is not repeated.

The optical module 7 differs from FIG. 6 of optical module 6 in that: the holder 701 further has a first groove 701c provided to a second part 701b. A shape of the first groove 701c is not intended as limitation, a cross sectional shape of the first groove 701c may be square, triangle, circle or other shape.

Therefore, in addition to that the optical module 7 has various functions as the optical module 6, by means of the first groove 701c of the holder 701, the optical module 7 may further make the connection member 703 only provided within a preset region. In other words, the first groove 701c may act as a limiting structure with respect to the connection member 703, when the connection member 703 is a fluid of epoxy or a solder, by means of the first groove 701c of the holder 701, the connection member 703 will not overflow the first groove 701c to contact the optical coefficient adjusting member 704 and contaminate the optical coefficient adjusting member 704.

Figure 8:
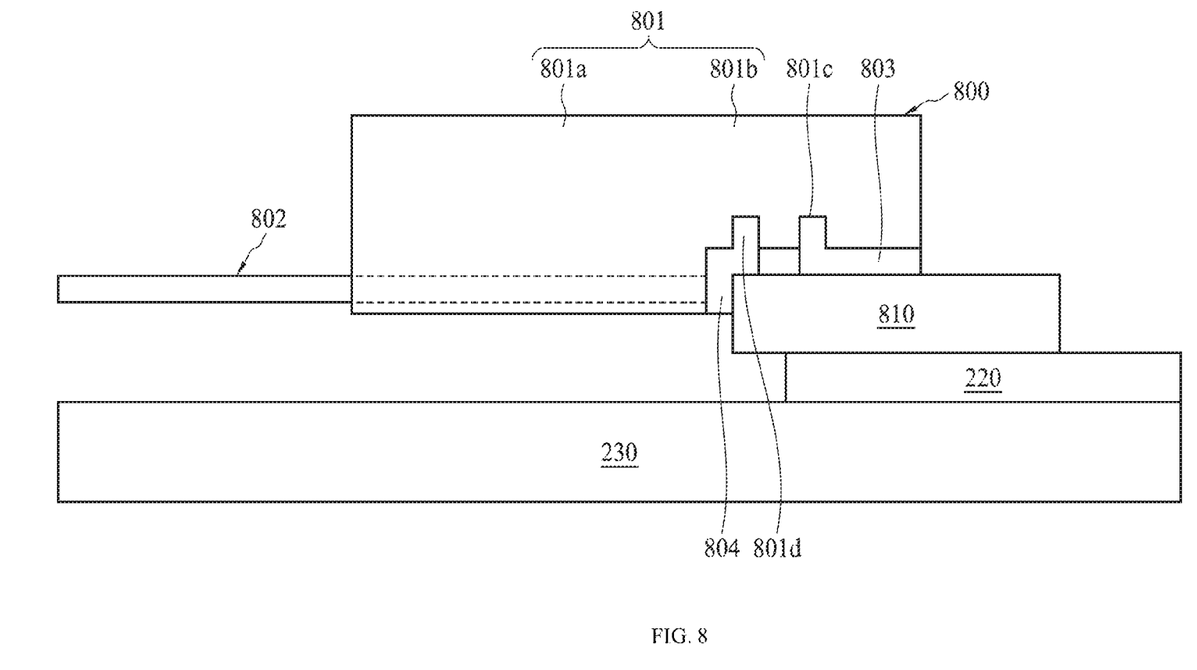
FIG. 8 is a side view of another optical module of the present disclosure.

FIG. 8 is a side view of another optical module 8 of the present disclosure. For example, the optical module 8 has an optical waveguide connection assembly 800 and an optical element 810. The optical waveguide connection assembly 800 has a holder 801, an optical fiber 802, a connection member 803 and an optical coefficient adjusting member 804. The optical element 810, the optical fiber 802, the connection member 803 and the optical coefficient adjusting member 804 are respectively similar to the optical element 710, the optical fiber 702, the connection member 703 and the optical coefficient adjusting member 704 of the optical module 7 of FIG. 7 in structure, so the description thereof is not repeated.

The optical module 8 differs from the optical module 7 of FIG. 7 in that: the holder 801 further has a second groove 801d provided to a second part 801b, and the second groove 801d and a first groove 801c are provided to be spaced apart from each other. The first groove 801c is close to the connection member 803, the second groove 801d is close to the optical coefficient adjusting member 804. A shape of the second groove 801d is not intended as limitation and may be the same as or different from a shape of the first groove 801c, and a cross sectional shape of the second groove 801d may be square, triangle, circle or other shape. The second groove 801d is used to prevent the optical coefficient adjusting member 804 from contacting the connection member 803.

Therefore, in addition to that the optical module 8 has various functions as the optical module 7, by means of the second groove 801d of the holder 801, the optical module 8 may further make the optical coefficient adjusting member 804 only provided within a preset region. In other words, the first groove 801c may act as a limiting structure with respect to the connection member 803, and the second groove 801d may act as a limiting structure with respect to the optical coefficient adjusting member 804, when the connection member 803 is a fluid of epoxy or a solder, by means of the first groove 801c of the holder 801, the connection member 803 will not overflow the first groove 801c, at the same time by means of the second groove 801d of the holder 801, the optical coefficient adjusting member 804 will not overflow the second groove 801d, in turn it may ensure that the connection member 803 does not contact the optical coefficient adjusting member 804, and it may avoid the connection member 803 and the optical coefficient adjusting member 804 contacting each other to contaminate the optical coefficient adjusting member 804.

Figure 9:
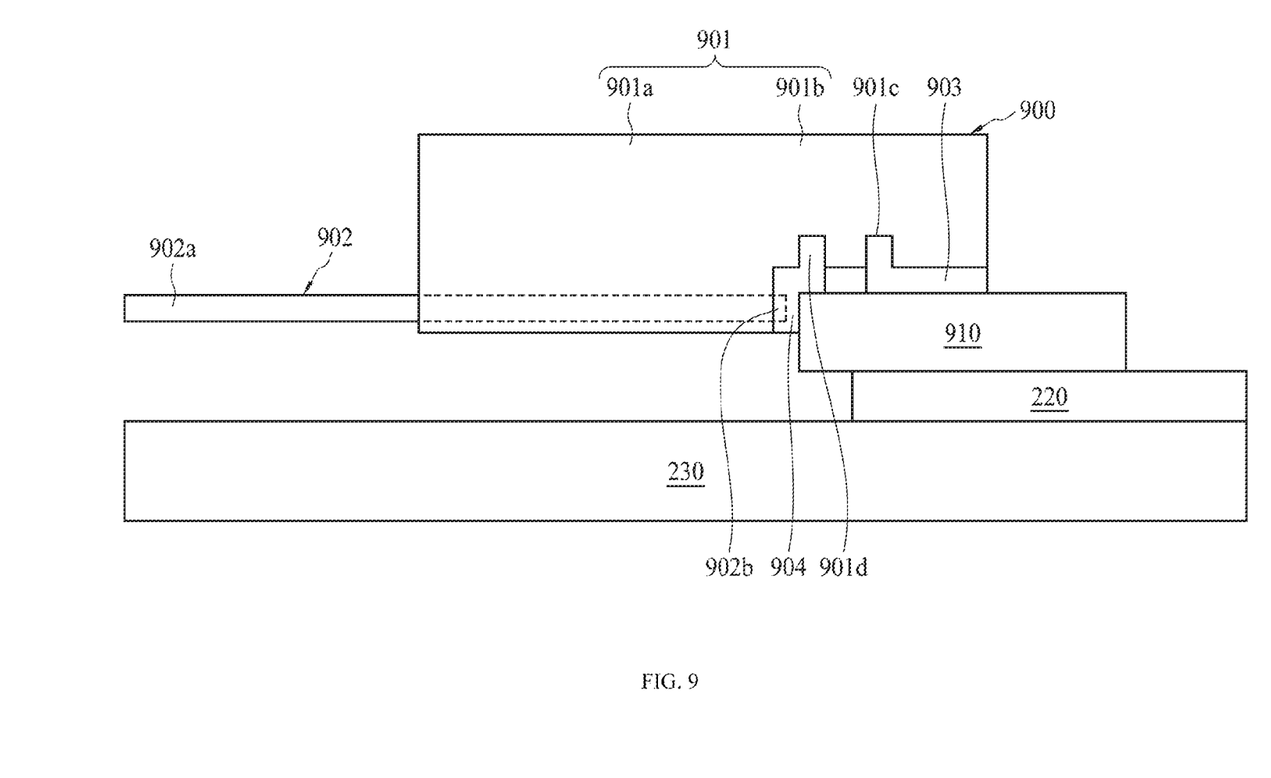
FIG. 9 is a side view of another optical module of the present disclosure.

FIG. 9 is a side view of another optical module 9 of the present disclosure. For example, the optical module 9 has an optical waveguide connection assembly 900 and an optical element 910. The optical waveguide connection assembly 900 has a holder 901, an optical fiber 902, a connection member 903 and an optical coefficient adjusting member 904. The holder 901, the optical element 910, the connection member 903 and the optical coefficient adjusting member 904 are respectively similar to the holder 801, the optical element 810, the connection member 803 and the optical coefficient adjusting member 804 of the optical module 8 of FIG. 8 in structure, so the description thereof is not repeated.

The optical module 9 differs from the optical module 8 of FIG. 8 in that: two ends 902a, 902b of the optical fiber 902 are exposed from a first part 901a. In other words, an end 902b of the optical fiber 902 connected with the optical coefficient adjusting member 904 is exposed to the first part 901a of the holder 901, and may be surrounded the optical coefficient adjusting member 904. That is, the first part 901a of the holder 901 has a first side and a second side opposite to the first side, the second side faces the optical element 910, and a protruding portion (that is, the end 902b) of the optical fiber 902 protrudes the second side, the optical coefficient adjusting member 904 is provided between the protruding portion and the optical element 910.

Therefore, in addition to that the optical module 9 has functions as the optical module 8, by that the optical fiber 902 is exposed to the first part 901a of the holder 901, the optical module 9 may lower difficulty of a mating process between the optical waveguide connection assembly 900 and the optical element 910, and may increase accuracy of the mating between the optical waveguide connection assembly 900 and the optical element 910. That is, because the optical fiber 902 has the protruding portion (that is, the end 902b) which is exposed to a side of the first part 901a, a position of the optical fiber 902 is visible, difficulty of a mating process between the optical fiber 902 and the optical waveguide structure (not shown) of the optical element 910 may be lowered, at the same time accuracy of the mating is increased.

While the present disclosure and advantages thereof are described in detail, it is understood that various changes, replacements and substitutions may be made without departing from the spirit and scope of the present disclosure defined by the appended claims. For example, many processes described above can be implemented in a variety of ways, and many processes described above can be replaced with other processes or combinations thereof.

Further, the scope of the present disclosure is not limited to the specific embodiments of process, machinery, manufacturing, substance composition, means, method or step described in the specification. Those skilled in the art can understand from the disclosed contents of the present disclosure that existing or future developed process, machinery, manufacturing, substance composition, means, method or step which has the same function or achieve essentially the same result as the corresponding embodiment described herein can be used in accordance with the present disclosure. Accordingly, such a process, machinery, manufacturing, substance composition, mean, method or step is included in the technical solution of the present disclosure.

What is claimed is:

1. An optical waveguide connection assembly, which is connected with an optical element, comprising:
   a holder comprising a first part and a second part, the first part being positioned a side of the optical element, the second part being positioned above the optical element;
   an optical fiber fixed to the first part;
   a connection member provided between the second part and the optical element; and
   an optical coefficient adjusting member provided between the optical fiber and the optical element, so that a beam is capable of being transferred between the optical fiber and the optical element via the optical coefficient adjusting member,
   wherein the optical waveguide connection assembly is fixed to the optical element via the connection member and the optical coefficient adjusting member, and
   wherein the optical fiber comprises an end exposed from the first part of the holder and surrounded by the optical coefficient adjusting member.

2. The optical waveguide connection assembly of claim 1, wherein the connection member and the optical coefficient adjusting member are provided to be spaced apart from each other.

3. The optical waveguide connection assembly of claim 1, wherein the holder further has a first groove which is provided to the second part and is used to prevent the connection member from contacting the optical coefficient adjusting member.

4. The optical waveguide connection assembly of claim 3, wherein the holder further has a second groove which is provided to the second part and is provided to be spaced apart from the first groove, the first groove is close to the connection member, the second groove is close to the optical coefficient adjusting member.

5. The optical waveguide connection assembly of claim 1, wherein the optical element is a non flip-chipped type photonic integrated circuit or a flip-chipped type photonic integrated circuit.

6. The optical waveguide connection assembly of claim 1, wherein the first part of the holder has a first side and a second side opposite to the first side, the second side faces the optical element.

7. The optical waveguide connection assembly of claim 6, wherein the optical fiber has a protruding portion which protrudes from the second side.

8. The optical waveguide connection assembly of claim 7, wherein the optical coefficient adjusting member is provided between the protruding portion and the optical element.

9. The optical waveguide connection assembly of claim 1, wherein a coefficient of thermal expansion of the holder is essentially the same as or similar to a coefficient of thermal expansion of the optical element.

10. The optical waveguide connection assembly of claim 1, wherein a coefficient of thermal expansion of the holder is in a range between 0.5 ppm/° C. and 10 ppm/° C., a coefficient of thermal expansion of the optical element is in a range between 0.5 ppm/° C. and 10 ppm/° C.

11. The optical waveguide connection assembly of claim 1, wherein the connection member comprises an epoxy, and the optical coefficient adjusting member comprises an index matching fluid.

12. An optical module, comprising:
    a substrate;
    an optical element which is positioned on the substrate; and
    an optical waveguide connection assembly positioned above the substrate and is connected with the optical element, wherein the optical waveguide connection assembly comprises:
      a holder comprising a first part and a second part, the first part being positioned a side of the optical element, the second part being positioned above the optical element;
      an optical fiber fixed to the first part;
      a connection member provided between the second part and the optical element;
      an optical coefficient adjusting member provided between the optical fiber and the optical element, so that a beam is capable of being transferred between the optical fiber and the optical element via the optical coefficient adjusting member,
      wherein the optical waveguide connection assembly is fixed to the optical element via the connection member and the optical coefficient adjusting member, and
      wherein the optical fiber comprises an end exposed from the first part of the holder and surrounded by the optical coefficient adjusting member.

13. The optical module of claim 12, wherein the connection member and the optical coefficient adjusting member are provided to be spaced apart from each other.

14. The optical module of claim 12, wherein the holder further has a first groove which is provided to the second part and is used to prevent the connection member from contacting the optical coefficient adjusting member.

15. The optical module of claim 14, wherein the holder further has a second groove which is provided to the second part and is provided to be spaced apart from the first groove, the first groove is close to the connection member, the second groove is close to the optical coefficient adjusting member.

16. The optical module of claim 12, wherein the optical element is a non flip-chipped type photonic integrated circuit or a flip-chipped type photonic integrated circuit.

17. The optical module of claim 12, wherein the first part of the holder has a first side and a second side opposite to the first side, the second side faces the optical element.

18. The optical module of claim 17, wherein the optical fiber has a protruding portion which protrudes from the second side.

19. The optical module of claim 18, wherein the optical coefficient adjusting member is provided between the protruding portion and the optical element.

20. The optical module of claim 12, wherein a coefficient of thermal expansion of the holder is essentially the same as or similar to a coefficient of thermal expansion of the optical element.

* * * * *